July 12, 1938.  E. R. GOLDFIELD ET AL  2,123,528
X-RAY APPARATUS
Filed March 6, 1937  2 Sheets-Sheet 2
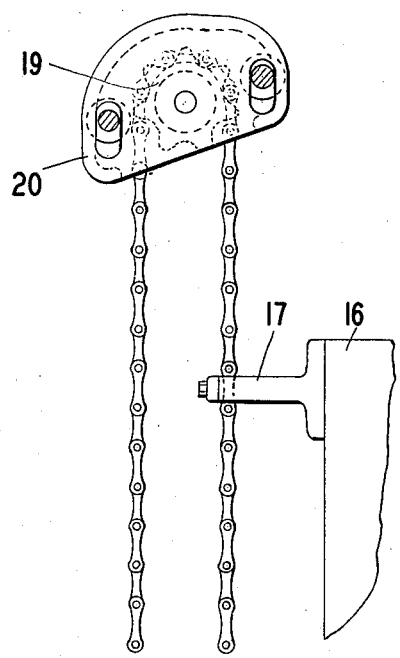
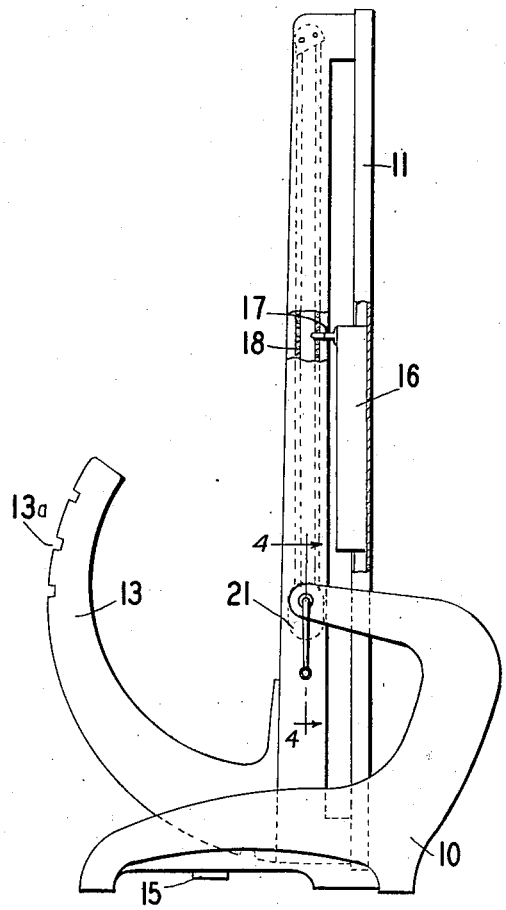
FIG. 2
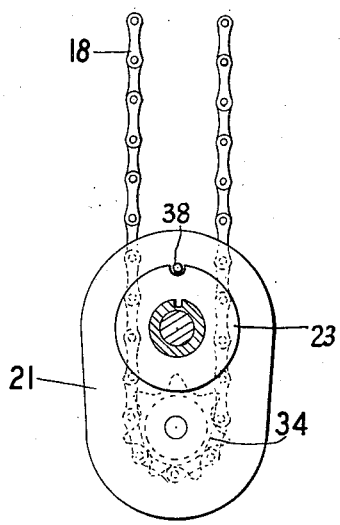
FIG. 3
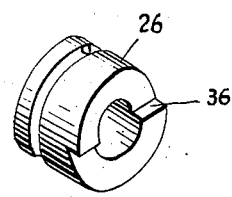
FIG. 7.
*INVENTOR*
EDWIN R. GOLDFIELD
BY CAPERTON B. HORSLEY
*ATTORNEY*

Patented July 12, 1938

2,123,528

UNITED STATES PATENT OFFICE 2,123,528

X-RAY APPARATUS

Edwin R. Goldfield, University Heights, and Caperton B. Horsley, Gates Mills, Ohio, assignors to Picker X-Ray Corporation Waite Manufacturing Division, Inc., Cleveland, Ohio, a corporation of Ohio Application March 6, 1937, Serial No. 129,420

7 Claims. (Cl. 250—34)

This invention relates to improvements in X-ray apparatus wherein a carriage is mounted for raising and lowering adjustment along a base part, and the invention is particularly applicable to improved means for adjustment of a grid diaphragm carriage along its tilting table.

A principal object of the invention is to lighten the weight of such apparatus by avoiding the usual counterbalance for the carriage and thus also, in a tilting table, the consequent excessive table weight.

Another important object of the invention is to provide that the operator-operated means for controlling the carriage have a location independent of adjusted positions of table and carriage.

The lightness of parts provided by the invention makes power unnecessary for their operation and the invention, therefore, embraces the provision of novel means for adjustments of the parts manually by the operator.

Our invention provides novel mechanism including an endless conveyor member connected with the carriage and means by which this conveyor member may be moved in either direction, with improved means for automatically maintaining the carriage against gravity, in any of its adjusted positions and independent of the adjusted position of the table.

Another feature of our invention is the structural combination of the pivot pin supporting the tilting table on a frame with the operating and housing mechanism for the carriage-moving means so that a simplification of structure is provided.

Our invention also comprises the novel structural features and the relationships between them shown in the accompanying drawings and described in the specification.

In the drawings,

Fig. 2 is a view similar to Fig. 1 showing the table in a tilted position;

Fig. 3 is an enlarged view of a portion of the mechanism of Figs. 1 and 2, showing a continuous conveyor chain connected with the carriage and with the mechanism for operating the chain;

Fig. 4 is an enlarged sectional view through the chain actuating mechanism of our device and taken along the line 4—4 of Figs. 2 and 5;

Fig. 5 is another sectional view of the same mechanism, taken along the line 5—5 of Fig. 4;

Fig. 6 is a view of the operating crank; while

Fig. 7 is a perspective view of clutch jaw 26.

Figure 1:
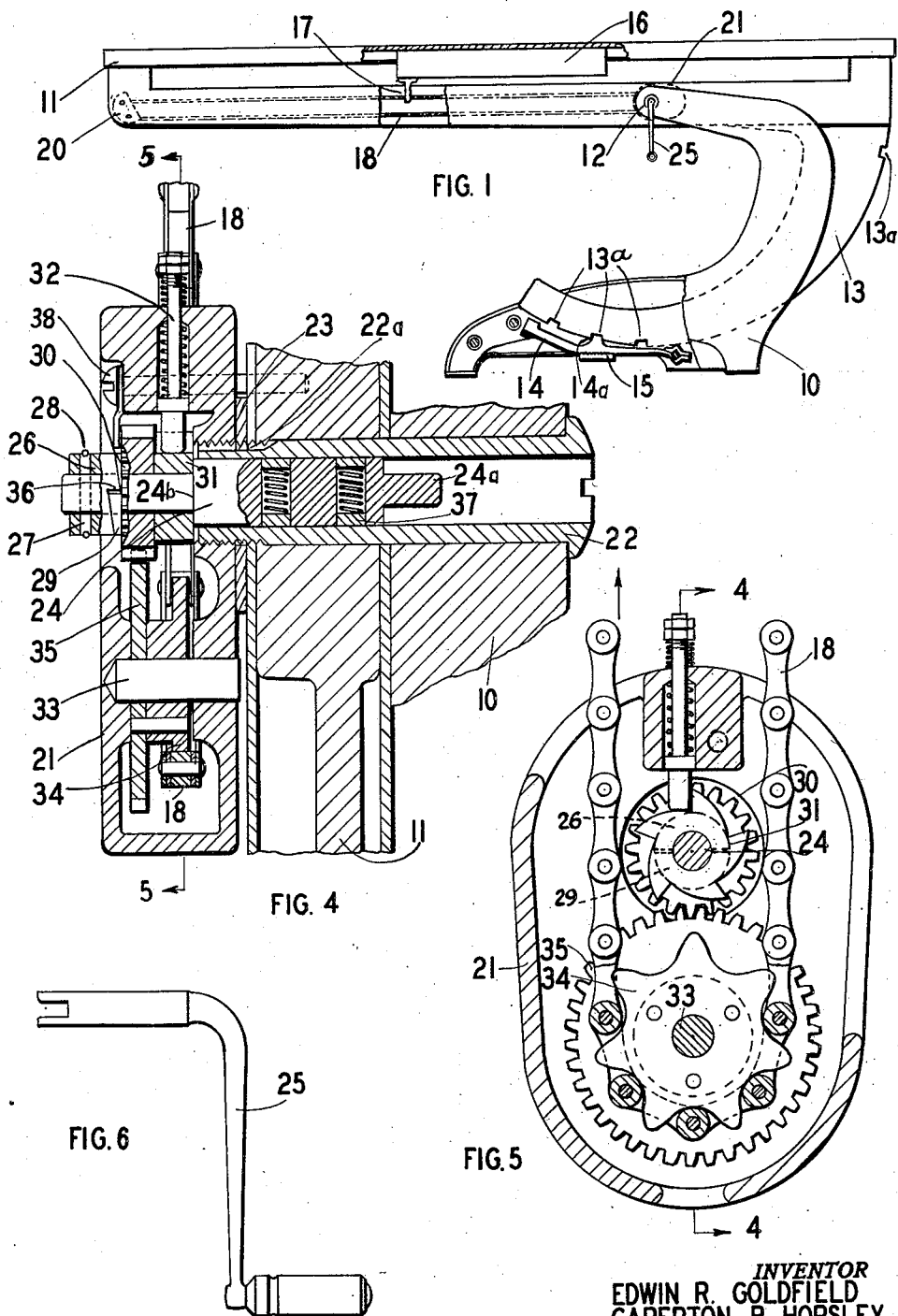
Fig. 1 is a side elevation of an X-ray tilting table equipped with our improved carriage controlling apparatus.

The general arrangement of the parts is best seen in Figs. 1 to 3, wherein a frame 10 supports a table 11 which is pivotally mounted on the frame at 12 in a manner more fully described hereafter. One or more counterbalancing arms 13 are rigidly secured to the table 11 and are provided with notches 13a which are adapted to be selectively engaged by a lug 14a on a locking lever 14 which preferably is provided with a pedal 15 by which it may be disengaged. As will be readily understood, by manipulating the locking lever, the table may be rotated by hand or by power about its pivot and tilted to any one of a number of positions, including the vertical position of Fig. 2, the horizontal position of Fig. 1, and other positions at various angles.

The grid diaphragm carriage 16 is mounted as usual for longitudinal adjustment beneath the table, and for such adjustment by the operator is connected as at 17 to a continuous conveyor member, such as the chain 18. This chain passes about a sprocket 19 housed in a suitable casing 20 at one end of the table and passes about a sprocket in a housing 21 adjacent the pivot 12. In the housing 21 is located the self-locking mechanism by which the carriage may be positioned and locked in position. By the term "carriage" we include one supporting a grid, filter, screen, sensitized plate or film and the like.

As best seen in Fig. 4, the pivotal mounting at the point 12 on which the table 11 is secured to the frame, is arranged in a novel manner. The hollow pivot bolt 22 passes through the frame 10 and the table 11 and has the casing 21 threaded upon its inner end whereby the casing acts as a nut to hold the table on the bolt secured to the frame. A key washer 23 held in position between the casing 21 and the table 11 enters a keyway 22a in the bolt or sleeve 22 so as to prevent rotation thereof after the parts have been assembled. The washer 23 is held against turning by pin 38.

The mechanism in casing 21 is best seen in Figs. 4 and 5. Within the hollow pivot bolt 22 is rotatably housed a shaft 24 having one end 24a adapted to receive the crank 25 shown in Fig. 6. To the opposite end of this shaft is secured the fixed jaw 26 of a circular wedge clutch device. The connection of this jaw with the shaft as shown comprises the pin 27 which is held in place by the snap ring 28. The movable jaw of the clutch is shown at 29 and is rotatably mounted on shaft 24 and in the form shown is integral with a pinion 30 which is also rotatable on shaft 24. Alongside the movable clutch jaw and pinion 30 is rotatably mounted on shaft 24 a ratchet wheel 31. A pawl 32 is reciprocably mounted in the upper end of casing 21 and is spring pressed toward the ratchet wheel. A shoulder 24b is provided at a fixed distance along shaft 24 from the jaw 26. While this shoulder might be a part of the casing, we prefer to form a shoulder as at 24b on the shaft 24 at the point where the shaft changes diameter as seen in Fig. 4.

It results from this construction that when relative rotation occurs between the wedge shape clutch jaws 26 and 29 in a direction to cause a camming of the movable jaw 29 axially along shaft 24, then the movable jaw, the pinion 30 and the ratchet wheel 31 are frictionally clamped to shaft 24 between the fixed jaw 26 and the shoulder 24b. To this end it is necessary that the shoulder 24b should be so positioned that the axial movement possible of the parts 29, 30 and 31 is less than the depth of the saw teeth on the clutch jaws. A second shaft 33 is mounted in casing 21 and carries a sprocket wheel 34 which is drivingly connected with chain 18. Also rotatable on this shaft and secured with sprocket 34 is pinion 35 adapted to mesh with pinion 30.

Viewing the parts as in Fig. 5 if clutch jaw 26 is rotated clockwise, or if jaw 29 is rotated counterclockwise, pinion 30 and ratchet wheel 31 will be cammed along shaft 24 and against shoulder 24b so as to be frictionally held between clutch jaw 26 and shoulder 24b to rotate with shaft 24.

The arrangement of the parts is such that the handle 25 may be rotated in either direction to move the conveyor chain and the carriage in either direction, but when the table is in the position of Fig. 2, or in any tilted position where a component of the force of gravity tends to cause downward movement of the carriage 16, which force is indicated by the arrow in Fig. 5, pinion 30 and movable clutch jaw 29 are rotated in a counterclockwise direction (Fig. 5) so that the cam faces of the saw teeth of the clutch cause axial movement of jaw 29, pinion 30 and ratchet wheel 31 on shaft 24 and frictionally clamps those parts between jaw 26 and shoulder 24b. All of these parts then move as a unit with shaft 24 and, as shown in Fig. 5, counterclockwise movement of this shaft is prevented by the pawl 32. Thus the carriage is locked in its adjusted position.

The operation of the parts by rotation of the crank handle 25 is as follows: When shaft 24 is rotated in a clockwise direction (Fig. 5), as to raise the carriage when the table is vertical, clutch jaw 26 is rotated clockwise and the cam faces of the saw tooth clutch lock the parts to the shaft between jaw 26 and shoulder 24b, but movement of the parts is possible because in this direction the ratchet wheel is permitted to move past the pawl 32. When shaft 24 is rotated in a counterclockwise direction by handle 25 as to lower the carriage when the table is vertical, jaw 26 is rotated counterclockwise (Fig. 5) so that the square shoulders 36 of the clutch provide the driving force and the parts 29 and 30 are freely rotatable on shaft 24.

Preferably a frictional drag is provided on shaft 24 so as to prevent a drifting of the parts and to insure a quicker clamping of the parts between jaw 26 and shoulder 24b when the clutch jaws are given a relative rotation in that direction which causes a camming of the jaws apart. Such a construction, as shown in Fig. 4, is provided by placing in suitable transverse bores of shaft 24, spring pressed blocks 37 which engage against the inner walls of bolt 22.

The placing of shaft 24 at the point where the table is pivotally mounted on the frame is an aid to the operator in locating handle 25 in a dark room, since the shaft location is thus fixed relative to the stationary frame.

What we claim is:

1. In X-ray apparatus comprising a table and a carriage movable therealong, a flexible endless conveyor member connected to said carriage, a rotatable drive member in driving relation with said conveyor member, means for rotating said drive member including a rotatable shaft, a saw tooth clutch having a jaw fixed to said shaft and a coacting movable jaw in driving relation with said drive member, said movable jaw being movable axially of said shaft and rotatable relative thereto, there being a shoulder substantially a fixed distance from said fixed jaw and limiting the movable jaw to axial movement less than the depth of said saw teeth, and means preventing rotation of said movable jaw upon rotation of the parts from the conveyor end of said drive in a direction to cause relative axial movement between said jaws.

2. X-ray apparatus as in claim 1, wherein said table is mounted for tilting with respect to a supporting frame on a hollow pivot pin, and said rotatable shaft is housed in said hollow pin.

3. In an X-ray tilting table structure having a carriage movable therealong, a drive member operatively connected with said carriage, said member being rotatably mounted on a shaft and movable axially thereof, a clutch jaw rotatable with said member and movable axially of said shaft, a fixed abutment, a fixed clutch jaw secured to said shaft, said abutment and fixed jaw having said drive member and movable jaw between them, said jaws being arranged with mutually engaging faces adapted to cam said jaws apart on relative rotation between said jaws in one direction and adapted to drivingly engage without camming action upon rotation in the opposite direction, the spacing of said abutment and fixed jaw with respect to the cam faces of said jaws being such that said camming action frictionally clamps said drive member between said abutment and fixed jaw upon camming of said jaws apart, and means preventing rotation of said drive member upon rotation of said movable clutch jaw from the carriage end of the drive in a direction to cause a camming apart of said jaws.

4. In an X-ray tilting table structure having a frame, a table, and a carriage movable therealong, the combination of a hollow pivot bolt rotatably securing said table to said frame, a shaft rotatably mounted in said bolt, one end of said shaft being adapted to receive a crank, the other end of said shaft having secured thereto the fixed jaw of a saw-tooth clutch, the movable jaw of said clutch being rotatably mounted on said shaft, a ratchet wheel rotatably mounted on said shaft alongside said movable jaw, a pawl for said ratchet wheel, a shoulder on said shaft on the side of said ratchet wheel and movable jaw opposite said fixed jaw, said shoulder being spaced from said fixed jaw to permit axial movement of said movable jaw and ratchet wheel along said shaft less than the depth of the saw teeth of said clutch, a pinion rotatable with said movable jaw, a second shaft, a pinion on said second shaft adapted to coact with said first pinion, a sprocket rotatable with said second pinion, a second sprocket on said table structure, an endless chain passing about said sprockets and connected with said carriage, and said pawl and ratchet wheel being arranged to prevent rotation of said ratchet wheel and movable jaw upon rotation of said parts from the chain end of said drive in a direction to cause relative axial separating movement between said clutch jaws at which time said ratchet wheel and movable jaw are frictionally clamped between said fixed jaw and shoulder.

5. An X-ray tilting table structure as in claim 4 including means placing a frictional drag on the rotation of said first named shaft.

6. X-ray apparatus comprising table means mounted for adjustment about an axis nearer one of its ends than the other, carriage means mounted on said table for adjustment therealong and unbalanced against movement by gravity in tilted positions of said table means, and control means for said carriage means including an operator-operated member and means arranged to automatically secure said carriage means in its adjusted positions, against movement by gravity, upon release of said member by the operator, independent of the adjusted position of said table means.

7. In X-ray apparatus, a table mounted for tilting about a transverse axis, and having a patient-supporting surface, a carriage for a Bucky diaphragm or the like mounted for adjustment along said table, and means for controlling said carriage, said means including a crank arranged to be turned by the operator about said axis.

EDWIN R. GOLDFIELD.
CAPERTON B. HORSLEY.